United States Patent [19]

Rupiper

[11] Patent Number: 5,919,005
[45] Date of Patent: Jul. 6, 1999

[54] GROUND ANCHOR DEVICE FOR PENETRATING AN UNDERGROUND ROCK FORMATION

[75] Inventor: Stan Rupiper, Tahoma, Calif.

[73] Assignee: Integrated Stabilzation Technologies Inc., Denver, Colo.

[21] Appl. No.: 08/946,907

[22] Filed: Oct. 9, 1997

Related U.S. Application Data

[63] Continuation-in-part of application No. 08/887,151, Jul. 2, 1997.

[51] Int. Cl.⁶ ........................................................ E02D 5/74
[52] U.S. Cl. ........................ 405/244; 405/236; 405/259.5; 175/323
[58] Field of Search ................................... 405/236, 240, 405/241, 242, 243, 244, 262, 263, 266, 269, 233, 259.5; 175/323, 331, 386, 387, 388, 394, 406; 52/155, 157, 158, 169.13, 705, 707

[56] References Cited

U.S. PATENT DOCUMENTS

| | | | |
|---|---|---|---|
| 3,470,701 | 10/1969 | Turzillo | 405/233 |
| 3,485,052 | 12/1969 | Turzillo | 405/241 |
| 3,604,214 | 9/1971 | Turzillo | 405/241 |
| 3,611,735 | 10/1971 | Daczko | 405/241 |
| 3,651,876 | 3/1972 | Henson | 175/323 |
| 3,690,109 | 9/1972 | Turzillo | 405/241 |
| 3,886,754 | 6/1975 | Turzillo | 405/241 X |

FOREIGN PATENT DOCUMENTS

| 85021 | 7/1981 | Japan | 405/241 |
|---|---|---|---|

*Primary Examiner*—Tamara Graysay
*Assistant Examiner*—Jong-Suk Lee
*Attorney, Agent, or Firm*—Edwin H. Crabtree; Ramon L. Pizarro; Donald W. Margolis

[57] ABSTRACT

A ground anchor device for securing a building foundation and other structures to a ground surface using the subject anchor device. The anchor device is designed to be self advancing when rotated into the ground surface to depths of 10 to 30 feet and greater and to engage and penetrate an underground rock formation for providing greater anchor stability. The device includes a plurality of external hollow pipe sections and a plurality of internal pipe sections. The external pipe sections are joined together with helix couplings. Each helix coupling includes a helix around the exterior surface of the helix coupling. The helice are used for driving the external pipe sections into the ground. The internal pipe sections are coupled together and have a hollow cross section with a lower end of one of the internal pipe sections attached to a rock bit. An upper end of one of the external pipe sections includes a drive cap for accepting various types of torque and percussion drives for drilling the anchor device into different types of soils. Also, an upper end of one of the internal pipe section is adapted for connection to a percussion rock drill for drilling the lower end of the internal pipe section into the rock. The lower end of the internal pipe section may include a series of grout holes along it's length for ejecting grout which is pumped under pressure through the grout holes for grouting the rock bit inside a drill hole.

12 Claims, 2 Drawing Sheets

GROUND ANCHOR DEVICE FOR PENETRATING AN UNDERGROUND ROCK FORMATION

The subject invention is a continuation-in-part application of Ser. No. 08/887,151, title "DRIVE DEVICE USED FOR SOIL STABILIZATION", filed on Jul. 2, 1997. The subject inventor is also a co-inventor of the CIP application. Both of the applications have been assigned to Integrated Stabilization Technologies, Inc., a Colorado Corporation.

BACKGROUND OF THE INVENTION (a) Field of the Invention

This invention relates to an anchor device for use in securing different types of structures on a ground surface and more particularly, but not by way of limitation, to an anchor device used for supporting building foundations, poles, signs, and other types of structures typically mounted or formed on a ground surface and requiring an enhanced foundation support.

(b) Discussion of Prior Art

Heretofore there have been a variety of different types of helical plate bearing anchors mounted on solid steel bar shafts and pipe shafts with plate helices that are drilled into soil and used as tension, compression and lateral force resisting members.

Also, there are many types of hollow drill rods and drill shafts used for circulating water, drill mud and the like during a drilling operation. The drill rods and shafts can be used with grout in forming tiebacks, mini-piles, rock anchors, soil nails and other micro pile uses. The usual exterior diameter of the rods and shafts are less than 2 inches.

Further, there are various types of auger tools made in the United States. The auger tools are used for excavating holes and may be used for collecting soil samples. This type of tool may have either a solid or hollow shaft with a disposable drill head. Also flight augers have continuous helices along the length of the shaft. Because of the expense of this type of auger, the auger is generally removed from a drill hole and not left in place to be used with grout in forming a mini-pile.

Still further, many steel piles are installed today using pipe of various sizes and weights. The load carrying capacity of this type of pile is usually developed by skin friction and/or point bearing. The steel piles are driven by a pile driving hammer or by boring a hole and placing grout around the exterior of the steel pile received in the hole.

In U.S. Pat. No. 5,575,593 to Raaf, a method and apparatus for installing a helical pier with pressurized grouting is disclosed. The patent describes the forming of grout nodules attached to an exterior of a pier column. The pier column includes a bracket for securing the column to a building foundation. The Raaf pier column is not designed to be reusable nor is it used for extracting fluids from a subsurface.

In U.S. Pat. No. 4,009,582 to LeCorgne, a method is described for forming a caseless concrete pile using a hollow pipe, a connector and a tubular driving mandrel. In U.S. Pat. No. 3,512,366 to Turzillo, a hollow auger for drilling holes is disclosed. The auger described in the Turzillo patent is withdrawn from the hole leaving a steel rod with drill bit in place with concrete poured therearound for forming a concrete pier.

In U.S. Pat. Nos. 4,492,493 and 4,756,129 to Webb and 3,115,226 to Thompson, Jr. different types of ground anchors and apparatus are described. Also, U.S. Pat. Nos. 4,998,849 to Summers, 3,961,671 to Adams et al. and 4,678,373 to Langenbach, Jr. disclose different types of driving apparatus and methods of shoring structures.

None of the above patents disclose or teach the unique combination of structure and functions of the subject anchor device having a combination of external pipe sections with helices thereon and internal pipes sections with a rock bit for drilling into an underground rock formation for providing greater anchor stability.

SUMMARY OF THE INVENTION

In view of the foregoing, it is a primary object of the present invention to provide an anchor device with helices that is self advancing into different types of soils and has the ability to drill into rock when rock is encounter underground. The invention provides a combination of a screw anchor which can be driven into different types of top soil and soft sedimentary ground formations and also driven into metamorphic and igneous rock formations for added anchor stability.

Another object of the invention is the anchor device is self advancing when rotated into the soil from a few feet to depths of 20 to 30 feet and greater. The device can be increased in size to suit nearly all soil and load conditions. The anchor device is also self advancing into rock formations by using a rock bit coupled to internal pipe sections which are adapted for connection to a percussion type rock drill.

Still another object of the subject invention is to provide a rugged yet inexpensive drilling tool that is removable and reusable. Also, the anchor device can be left in place and grouted for forming an anchor or load carry pier or it can be used as a grout dispenser. The anchor device includes helix couplings of different sizes with and without perforations. The helix couplings can be used with different lengths and diameters of external and internal pipe sections for easy adaption to different types of soil conditions.

A further object of the unique anchor device is the drill hole drilled by the rock bit can be grouted using grout holes in the sides of a lower internal pipe section. In this manner, the rock bit and lower internal pipe section can be grouted in place for added anchor stability.

The subject anchor device includes a plurality of external hollow pipe sections and a plurality of internal pipe sections. The external pipe sections are joined together with helix couplings. Each helix coupling includes a helix around the exterior surface of the coupling. Also, the exterior surface of the external pipe sections may also include helices. The helices are used for driving the external pipe sections into the ground. The internal pipe sections are coupled together and have a hollow cross section with a lower end of one of the internal pipe sections attached to a rock bit. An upper end of one of the external pipe sections includes a drive cap for accepting various types of torque and percussion drives for drilling the anchor device into different types of soils. Also, an upper end of one of the internal pipe section is adapted for connection to a percussion rock drill for drilling the rock bit and the lower end of the internal pipe section into the rock. The lower end of the internal pipe section may include a series of grout holes along it's length for receiving grout which is pumped under pressure through the grout holes for grouting the rock bit and the lower end of the internal pipe section inside a drill hole drilled by the rock bit.

These and other objects of the present invention will become apparent to those familiar with screw anchor stabilization equipment and methods of supporting building foundations from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
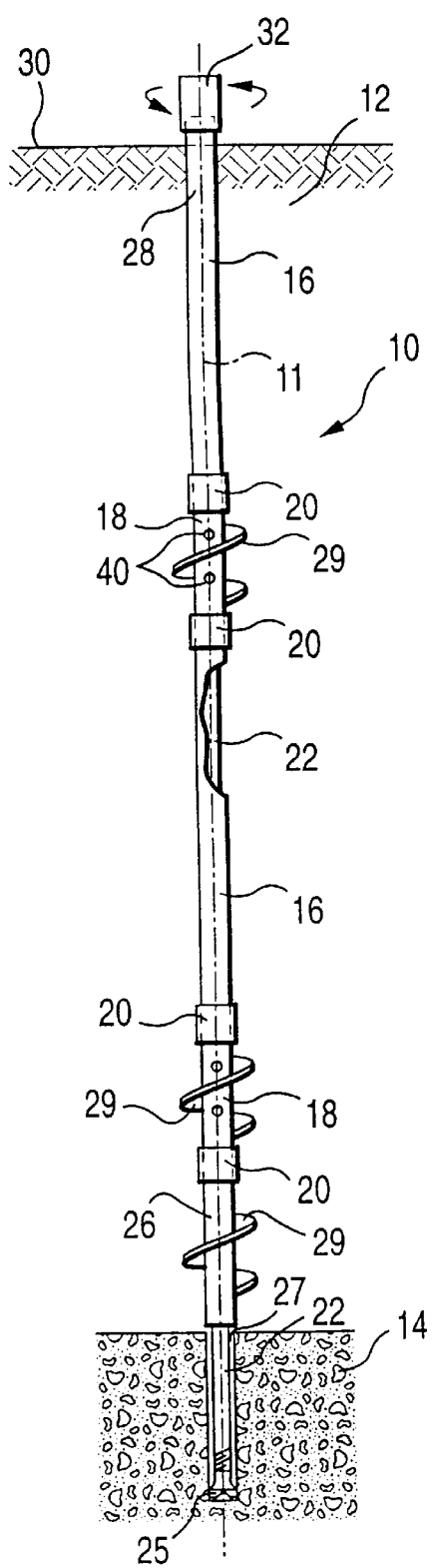
FIG. 1 is a front view of the subject anchor device having been driven to a selected depth before encountering an underground rock formation with a rock bit coupled to an internal pipe section for drilling a drill hole into the rock formation.

In FIG. 1, a front view of the subject anchor device is shown having a general reference numeral 10. The anchor device 10 has been driven to a selected depth in a subsurface 12 before encountering an underground rock formation 14. The device 10 includes a plurality of external pipe sections 16 attached to opposite ends of an external pipe coupling 18 using connecting sleeves 20. The device 10 is shown with a center line 11 through the center and along the length of the pipe sections 16. The diameter and lengths of the external pipe section 16 will vary depending on the application.

Figure 2:
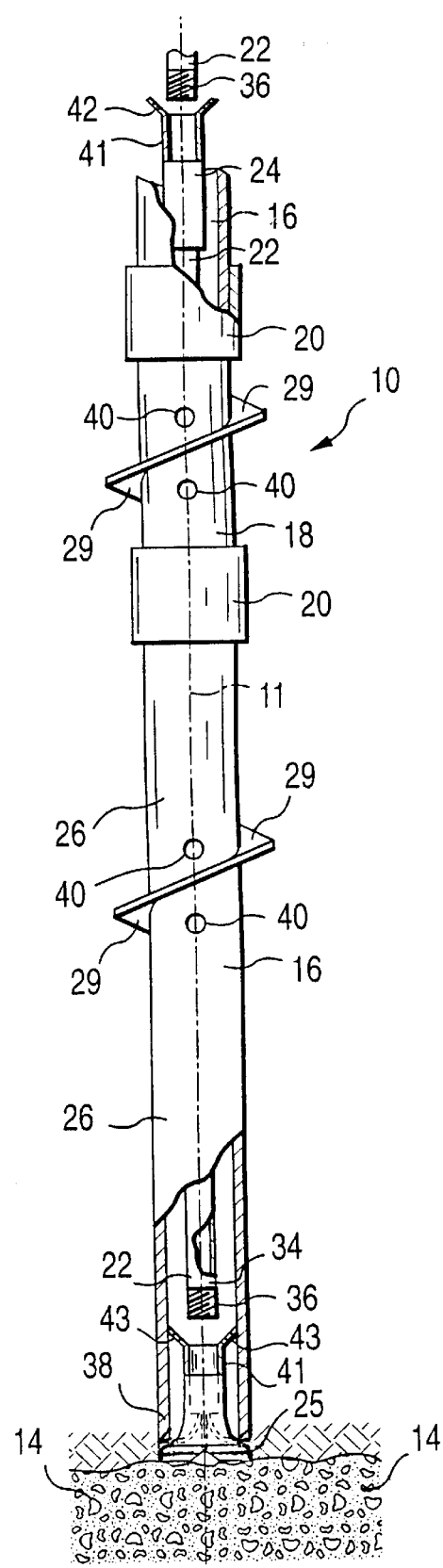
FIG. 2 is an enlarged front view of an external pipe extension and a helix coupling with helices thereon and a lower portion of an internal pipe section. A portion of the pipe extension has been cut away to expose the internal pipe section positioned for being threaded into the rock bit resting on the end of the external pipe extension.

Shown in this drawing, is a portion of one of the external pipe sections 16 cut away to show a portion of an internal pipe section 22. The anchor device 10 includes a plurality of internal pipe sections 22 joined together using internal pipe couplings 24. One of the pipe couplings 24 is shown in FIG. 2. A lower pipe section 22 is shown attached to a rock bit 25 which has been used to drill a drill hole 27 into the rock formation 14.

Also, in this drawing, the device 10 is shown with a pair of external pipe couplings 18 attached to a pair of external pipe sections 16. Each of the external pipe couplings 18 is shown having a helix 29 therearound. The lower external coupling 18 is attached using the connecting sleeve 20 to a pipe extension 26. The pipe extension 26 also is also shown having a helix 29. If desired, the external pipe sections may also include a helix 29 therearound for aiding in self advancing the anchor device 10 into the subsurface 12.

An upper end 28 of the external pipe section 16 is shown in FIG. 1 next to a ground surface 30 and attached to a drive cap 32. The drive cap 32 is adapted for attachment to a rotary torque drive, a percussion drill, a jacking apparatus, a vibratory driving device, water jetting and like drilling equipment used with the subject device 10 for penetration to depths of 20 to 30 feet and greater into the subsurface. The drive cap 32 is also adaptable for accepting air pressure, hydraulic pressure, expanded foam pressure along with swivels, flexible couplings, grout and foam tubes and other plumbing arrangements for injecting fluids into the external and internal pipes 16 and 22. When the rock bit 25 is used for drilling into the rock formation 14, the drive cap 32 is removed and an upper portion of an interior pipe section 22 is attached to either a rotary drilling machine or a percussion rock drilling machine. The drilling machine is not shown in the drawings.

In FIG. 1, while the external pipe sections 16, the external pipe couplings 18 and the pipe extension 26 are shown with helix 29 thereon, it can be appreciated that the sections 16, the pipe couplings 18 and the extension 26 may or may not include helices 29 thereon depending on the application and the ground conditions when driving the anchor device 10 into the subsurface 12.

In FIG. 2, an enlarged front view of the external pipe extension 26 with a helix 29 thereon is shown. A portion of the pipe extension 26 has been cut away to expose a lower end 34 of one of the internal pipe sections 22. The lower end 34 includes threads 36 which are used for threading into the top of the rock bit 25. In this drawing, the rock bit 25 can be seen resting on a lower end 38 of the external pipe extension 26. The diameter of the rock bit 25 is the same or greater than the outer diameter of the pipe extension 26. Disposed below the lower end 34 of the internal pipe section 22 is a pipe guide 41 which is releasably attached to the top of the rock bit 25. The pipe guide 41 is used to receive the lower end 34 of the pipe section 22 therethrough and for indexing the threads 36 into the top of the rock bit 25. The pipe guide 41 is used obviously when the pipe section 22 has not been connected to the rock bit 25 prior to advancing the anchor device 10 into the subsurface 12. Also, the pipe guide 41 includes spaces 43 therein which are large enough for allowing rock chips to pass upwardly between the inner circumference of the pipe extension 26 and the outer circumference of the internal pipe section 22 during the drilling operation. The pipe guide 41 may be made of a light weight sheet metal, plastic and the like materials.

Also shown in this drawing, is a portion of one of the connection sleeves 20 and a portion of a lower end of one of the external pipe sections 16 cut away to expose an upper end of one of the internal pipe sections 22. In this view, the upper end of the pipe section 22 is shown attached to an internal pipe coupling 24. Mounted on top of the internal pipe coupling 24 is another pipe guide 41 for receiving a lower end of an internal pipe section 22 and guiding the treads 36 of the pipe section 22 into the top of the internal pipe coupling 24 for coupling thereto. Further, one of the external pipe couplings 18 is shown with helix 29 and perforations 40. The perforations 40 are used, if desired, for introducing grout pumped under pressure into the surrounding soil when it is desired to provide additional stabilization by forming a concrete type pier around and along the length of the anchor device 10.

Figure 3:
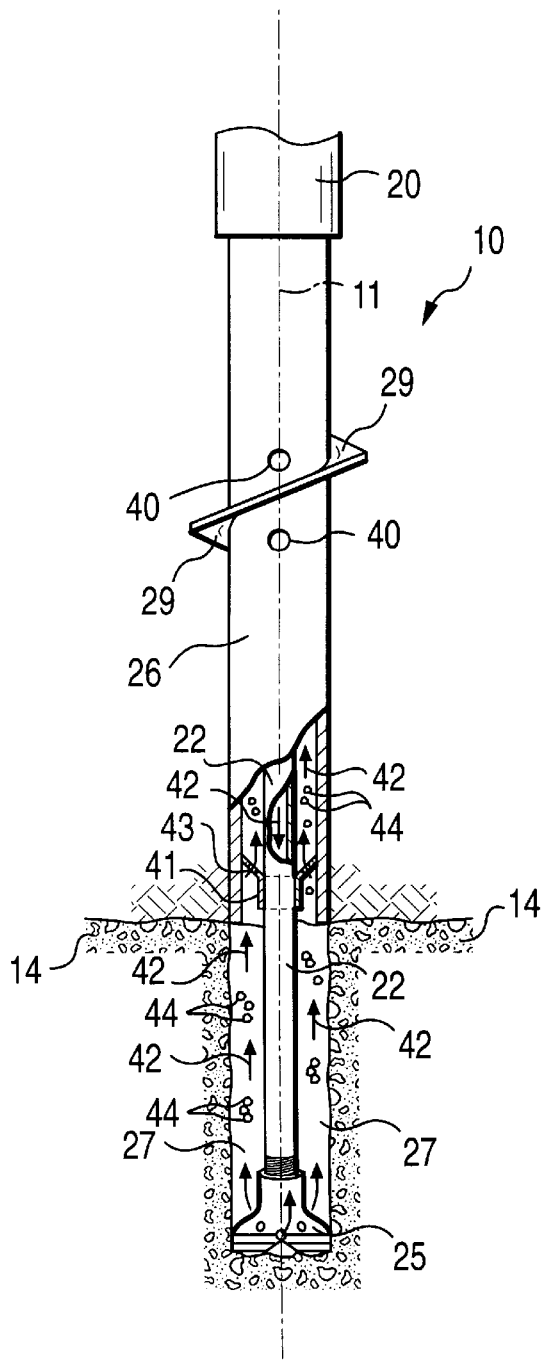
FIG. 3 is an enlarged front view similar to FIG. 2 and illustrating the rock bit drilling into the rock formation with rock chips circulated upwardly between the inner circumference of the exterior pipe extension and the outer circumference of the interior pipe sections.

In FIG. 3, an enlarged front view of the external pipe extension 26 is shown illustrating the rock bit 25 drilling into the rock formation 14. As mentioned above, a percussion drilling machine or rotary drilling machine is attached to the top of the internal pipe sections 22 and high pressure air and/or water, shown as arrows 42, is introduced downwardly through the hollow pipe sections 22 for removing rock chips 44 from the drill hole 27. The rock chips 44 are shown being circulated upwardly between the inner circumference of the exterior pipe extension 26 and the outer circumference of the interior pipe sections 22. While high pressure air 22 is shown, it can be appreciated that the air 22 can be mixed with water for dust control during the rock drilling operation.

Figure 4:
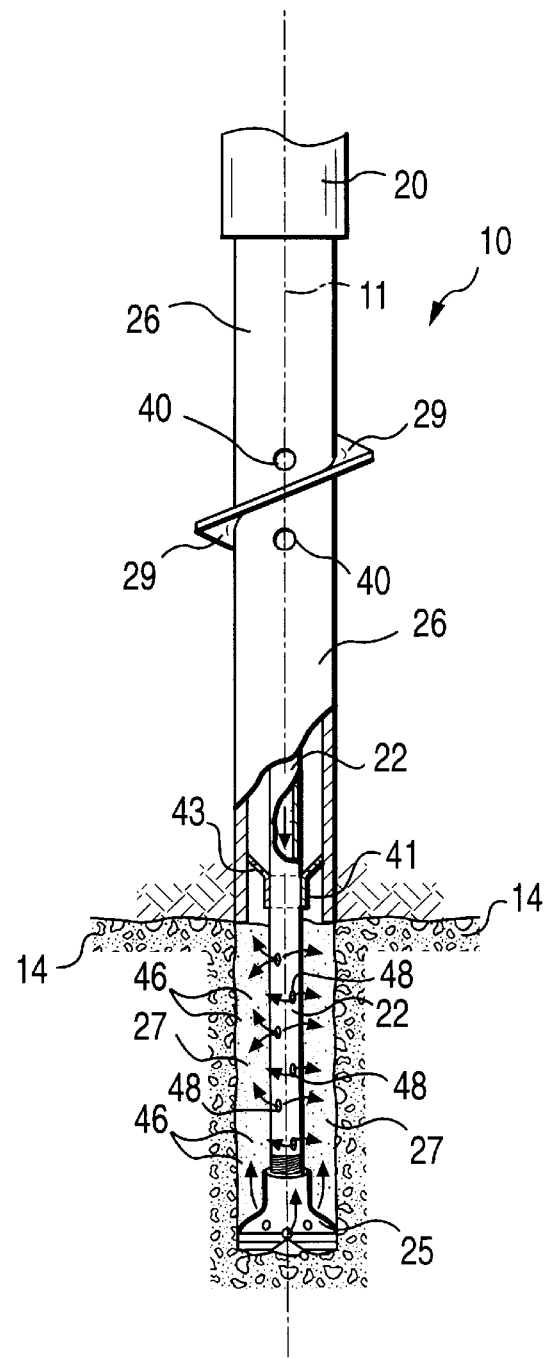
FIG. 4 is an enlarged front view similar to FIG. 3 and illustration the circulating of grout through grout holes in the lower interior pipe section for grouting the pipe section and rock bit in the drill hole.

In FIG. 4, an enlarged front view similar to FIG. 3 is illustrated wherein the rock drilling operation has been completed and grout 46, shown as small dots, is circulated into the completed drill hole 27. The grout 46 is introduced through grout holes 48 along a length of the lower portion of the interior pipe section 22. In this manner, the drill hole 27 is filled with grout 46 and the rock bit 25 and pipe section 22 are cemented in place for added anchor stability and strength when using the unique ground anchor device 10.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A ground anchor device for securing a building foundation and other structures to a ground surface, the anchor device designed to be self advancing when rotated into the ground surface to depths of 10 to 30 feet and greater and to engage and penetrate an underground rock formation for providing greater anchor stability, the anchor device comprising:
    a first external hollow pipe section;
    an external pipe extension having a helix thereon; said helix adapted for helping self advance said external pipe extension into the ground surface;
    a first external pipe coupling having a helix thereon, said first external pipe coupling releasably connecting together said first external pipe section and said external pipe extension;
    a first internal hollow pipe section received inside said external pipe section and said first external pipe extension; and
    a rock bit attached to a lower end of said first internal pipe section and next to a lower end of said first external pipe extension, said rock bit adapted for drilling into the rock formation.

2. The anchor device as described in claim 1 further including a second external pipe section, said first and second external pipe sections releasably connected together by a second external pipe coupling, said second external pipe coupling having a helix thereon.

3. The anchor device as described in claim 1 further including a second internal pipe section, said first and second internal pipe sections releasably connected together by an internal pipe coupling.

4. The anchor device as described in claim 1 further including a pipe guide disposed inside said first external pipe extension and disposed adjacent a top of said rock bit for guiding a lower end of said first internal pipe section into the top of said rock bit.

5. The anchor device as described in claim 1 wherein the lower end of said first internal pipe section includes a plurality of grout holes therein for receiving grout therethrough when grout is pumped under pressure through said first internal pipe section.

6. A ground anchor device for securing a building foundation and other structures to a ground surface, the anchor device designed to be self advancing when rotated into the ground surface to depths of 10 to 30 feet and greater and to engage and penetrate an underground rock formation for providing greater anchor stability, the anchor device comprising:
    a first external hollow pipe section;
    an external pipe extension having a helix thereon; said helix adapted for helping self advance said external pipe extension into the ground surface;
    a first external pipe coupling having a helix thereon, said first external pipe coupling releasably connecting together said first external pipe section and said external pipe extension;
    a second external hollow pipe section;
    a second external pipe coupling having a helix thereon, said second external pipe coupling releasably connecting together said first external pipe section and said second external pipe section;
    a first internal hollow pipe section received inside said first external pipe section and said external pipe extension;
    a second internal hollow pipe section received inside said first and second external pipe sections;
    a first internal pipe coupling releasably connecting together said first and second internal pipe sections; and
    a rock bit attached to a lower end of said first internal pipe section and next to a lower end of said first external pipe extension, said rock bit adapted for drilling into the rock formation.

7. The anchor device as described in claim 6 further including a pipe guide disposed inside said external pipe extension and disposed adjacent a top of said rock bit for guiding a lower end of said first internal pipe section into the top of said rock bit.

8. The anchor device as described in claim 6 wherein the lower end of said internal pipe section includes a plurality of grout holes therein for receiving grout therethrough when grout is pumped under pressure through said first and second internal pipe sections.

9. A ground anchor device for securing a building foundation and other structures to a ground surface, the anchor device designed to be self advancing when rotated into the ground surface to depths of 10 to 30 feet and greater and to engage and penetrate an underground rock formation for providing greater anchor stability, the anchor device comprising:
    a first external hollow pipe section;
    an external pipe extension having a helix thereon; said helix adapted for helping self advance said external pipe extension into the ground surface;
    a first external pipe coupling having a helix thereon, said first external pipe coupling releasably connecting together said first external pipe section and said external pipe extension;
    a second external hollow pipe section;
    a second external pipe coupling having a helix thereon, said second external pipe coupling releasably connecting together said first external pipe section and said second external pipe section;
    a first internal hollow pipe section received inside said first external pipe section and said external pipe extension;

a second internal hollow pipe section received inside said first and second external pipe sections;

a first internal pipe coupling releasably connecting together said first and second internal pipe sections;

a rock bit attached to a lower end of said first internal pipe section and new to a lower end of said external pipe extension, said rock bit adapted for drilling into the rock formation; and a first pipe guide disposed inside said external pipe extension and disposed adjacent a top of said rock bit for guiding and threading the lower end of said first internal pipe section into the top of said rock bit.

10. The anchor device as described in claim 9 wherein the lower end of said first internal pipe section includes a plurality of grout holes therein for receiving grout therethrough when grout is pumped under pressure through said first and second internal pipe sections.

11. The anchor device as described in claim 9 further including a second pipe guide disposed on a top of said first internal pipe coupling for guiding a lower end of said second internal pipe section into said first internal pipe coupling.

12. The anchor device as described in claim 9 wherein an outer diameter of said rock bit is the same or greater than an outer diameter of said external pipe extension.

* * * * *